United States Patent [19]

Oates, Sr. et al.

[11] 4,328,834

[45] May 11, 1982

[54] PINCH VALVE

[75] Inventors: Ronald W. Oates, Sr., Chalfont; John C. Fagan, Philadelphia, both of Pa.

[73] Assignee: SCM Corporation, New York, N.Y.

[21] Appl. No.: 181,578

[22] Filed: Aug. 27, 1980

[51] Int. Cl.³ .................... F16K 11/18; F16L 55/14
[52] U.S. Cl. ................................ 137/636.1; 74/54; 251/9; 251/251; 251/284; 239/289; 239/447; 239/563; 222/485
[58] Field of Search .................. 137/607, 636.1, 625.4, 137/628; 251/9, 10, 251, 284; 74/54; 239/444, 289, 447, 563; 222/485

[56] References Cited

U.S. PATENT DOCUMENTS

| | | | |
|---|---|---|---|
| 2,011,285 | 8/1935 | Jackson et al. | 251/9 |
| 2,311,464 | 2/1943 | Parker | 137/636.1 |
| 2,311,465 | 2/1943 | Parker | 137/636.1 |
| 2,525,313 | 10/1950 | Putnam | 137/636.1 |
| 3,016,915 | 1/1962 | Moeller, Jr. | 251/9 |
| 3,077,900 | 2/1963 | Ehrmann et al. | 239/289 |
| 3,411,534 | 11/1968 | Rose | 251/9 |
| 3,450,152 | 6/1969 | Ouellette | 251/9 |
| 3,754,768 | 8/1973 | Ellis et al. | 251/9 |
| 3,812,875 | 5/1974 | Buhler | 137/636.1 |
| 3,861,421 | 1/1975 | Thompson | 137/636.4 |
| 4,020,871 | 5/1977 | Groth et al. | 137/636.1 |

*Primary Examiner*—George L. Walton
*Attorney, Agent, or Firm*—William E. Mear, III; Ernest F. Weinberger

[57] ABSTRACT

A pinch valve for selectably controlling flow of fluid through one of two resiliently deformable tubes used e.g., for transporting water in a steam iron. The valve comprises a body member defining a compression surface supporting each one of the tubes. A selector lever is pivotally mounted on the body for selectably moving an integral cam abutment between individual tube shut-off positions. A rocker element supported on the tubes is captively held in the body member intermediate the selector lever and the compression surface for rocking movement between tube pinching positions. The cam abutment continually presses on the rocker causing the rocker to bear upon each one of the tubes on the compression surface. As the selector lever is pivoted, the cam abutment engageably slides along the rocker to rock the rocker between its tube pinching positions. The tubes are thus isolated from sliding contact with the cam abutment by the interposed rocker thereby preventing frictional wear of the tubes.

11 Claims, 6 Drawing Figures

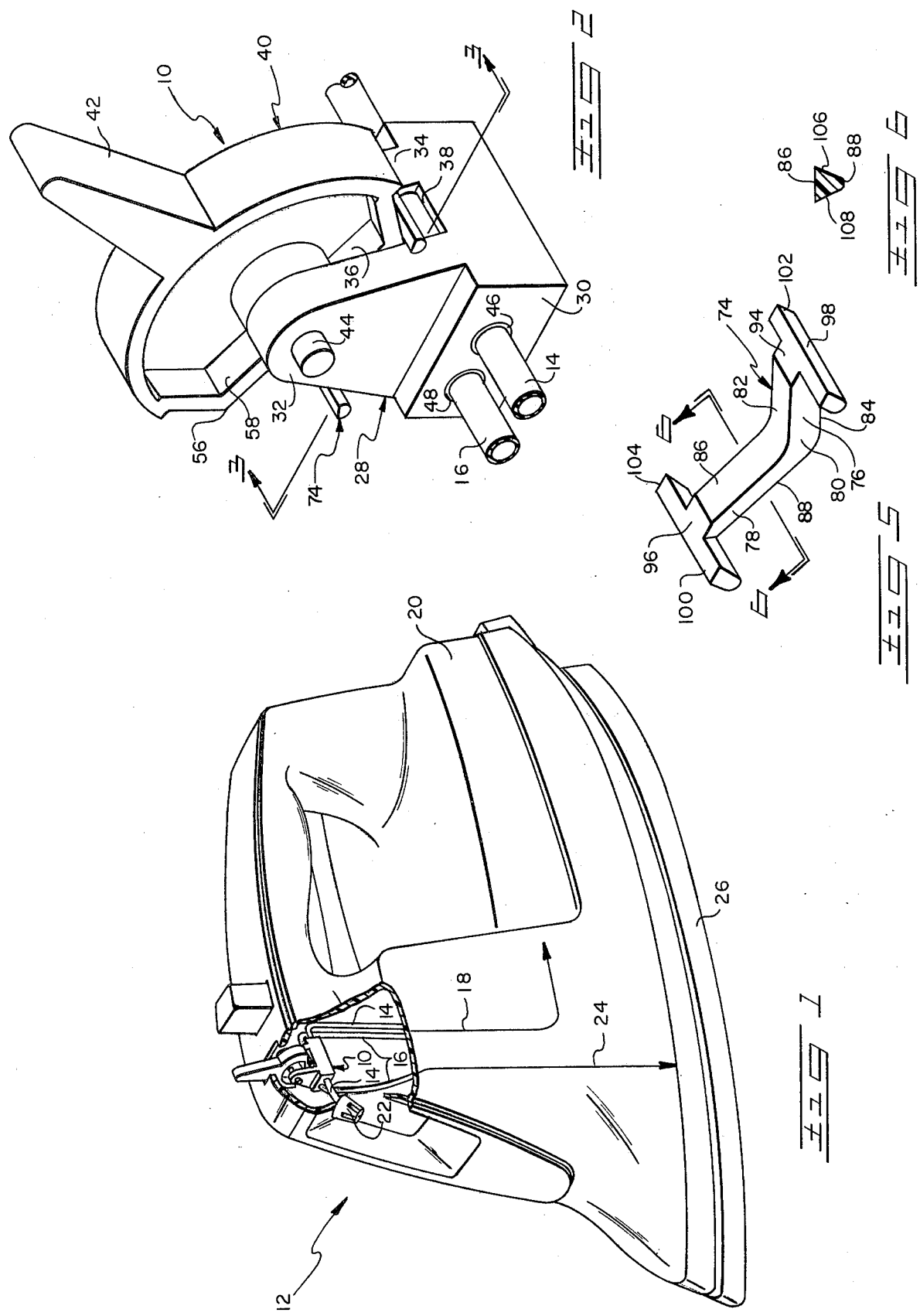

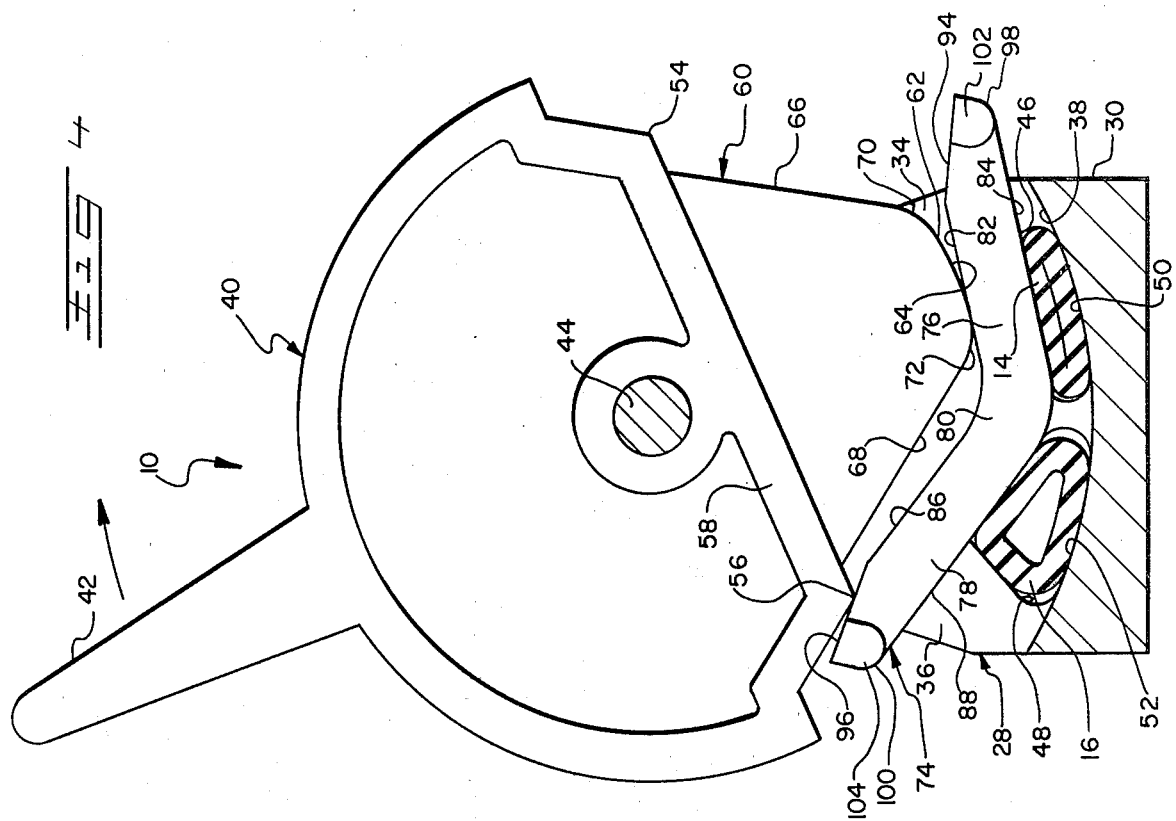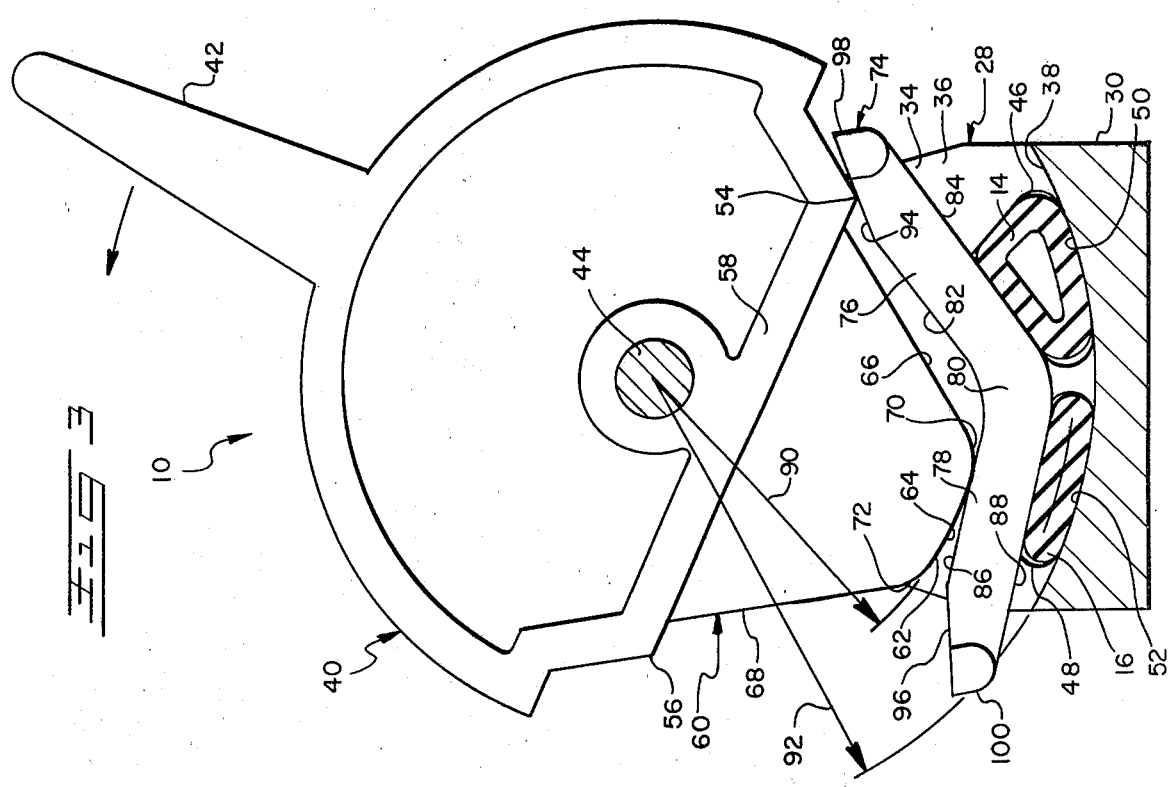

PINCH VALVE

BACKGROUND OF THE INVENTION

1. Field of the Invention

The present invention relates to valve assemblies for selectably determining fluid flow through one of two tubes used, e.g., in a steam iron. More particularly, the present invention relates to improvements in a pinch valve assembly wherein the tubes are isolated from frictional wear from sliding members.

2. Description of the Prior Art

In the art of pinch valves of the kind operable to selectably effect fluid flow through one of two flexible tubes, it is customary to employ a two-way tube clamping device that selectably engages the tubes to shut off fluid flow through one tube while permitting fluid flow through the other tube. This kind of valve is particularly suited for use in conjunction with controlling the flow of water through a steam iron wherein water is contained in a reservoir. Water is pumped from a reservoir towards the valve through a pair of tubes and thereafter allowed to flow from the valve towards a spray nozzle exit or a steam release base plate depending on the tube blocking condition of the valve.

Heretofore, valves operable for pinchably closing a flexible section of tubing in the valve have encountered significant problems in terms of providing a tube clamping device that reliably operates over extended periods of time, i.e., for the life of the appliance containing the valve. In this regard, it is highly desirable to provide a tube clamping device in the valve that continually operates in a manner whereby frictional wear of the tubes is avoided in the presence of repeated tube opening and closing operations. Another major concern in providing a lasting valve is that they continually operate to completely close the pinched tube to block fluid flow, and thus avoid maintenance to correct fluid leakage therethrough. For example, U.S. Pat. No. 3,635,251 entitled "Valve", granted on Jan. 18, 1972 to Stanley L. Gaines, discloses a bistable acting valve having a spring member operable to flex between two positions for selectably closing one of two flexible tubes. One distinct problem presented by this kind of valve arrangement resides in its use of a pretensioned spring to collapse the tubes. Over a period of time, the pretensioning forces of the spring will increasingly lessen towards becoming incapable of completely collapsing the tube. Through Gaines suggests in his patent that the spring tensioning forces are adjustable, by moving the spring anchor position, such an adjustment is difficult and sensitive to make requiring the service of one skilled in the art.

Regarding frictional wear of the flexible tubes caused by a sliding action delivered from the clamping member onto the tubes in repeatedly opening and closing the tubes, if remained unchecked, sliding frictional wear will result in the tube wall being worn thin or even ruptured requiring difficult and costly tube replacement. Two examples of valves wherein the flexible tube(s) are exposed to frictional sliding engagement with clamping members are U.S. Pat. Nos. 3,411,534 entitled "Four-Way Valve", granted Nov. 19, 1968 to Frank L. Rose, and 4,177,969 entitled "Flow Control Device", granted Dec. 11, 1979 to Paul Sieber-Muller.

SUMMARY OF THE INVENTION

The present invention solves the above-mentioned wear problem associated with sliding action pinch valves by providing a valve equipped with a rocker element operable for movement between selectable tube pinching positions in a manner whereby flexible tubes are isolated from sliding contact with a tube shut off controller thus avoiding sliding frictional wear of the tubes. The rocker element is operable in two individual positions for selectably blocking fluid flow through one tube while permitting fluid flow through another tube.

The pinch valve assembly according to the present invention comprises a body member having a compression surface supporting a pair of resiliently deformable tubes. A selector lever is pivotably mounted on the body member for movement between two selectable positions. A cam abutment is formed on the selector lever and extends toward the compression surface. A rocker element is supported on the tubes intermediate the cam abutment and the compression surface and is slidably engaged by the cam abutment for rocking the rocker element in response to movement of the selector lever. The cam abutment is dimensioned to engage a top surface of the rocker element causing the bottom edge of the rocker to bear against each tube on the compression surface. In each one of the selectable positions of the selector lever, one of the tubes is completely collapsed while the other tube is allowed to open. The cam abutment is provided with a camming surface including a pair of cam lobes operable to slidingly engage with arms of the rocker element for effecting tube pinching rocking motion of the rocker element.

In operation, the selector lever is manually pivoted from one position towards the desired position for switching the flow of fluid through the tubes. In pivoting the selector lever, one cam lobe on the cam abutment engagingly slides along the top surface of one rocker arm onto the top surface of the other arm for sliding engagement therewith. As the cam abutment slidably continues, the rocker is rocked causing the newly engaged arm of the rocker element to increasingly bear against its tube causing that tube to collapse. The resilient tube in being collapsed provides upwardly forces on the arm resisting collapse of the tube. Once the selector lever is pivoted beyond an upright position, the cam abutment moves rapidly in a snap action due to the forces resisting collapse of the tube being quickly overcome. The other or following lobe of the cam abutment slidably engages the tube compressing arm of the rocker to completely collapse that tube. The other non-engaged arm is tipped upwardly to allow its tube to open. To reverse the position of the selector lever and thereby block the other tube a similar sequence of events occurs. Thus, the tubes are continually isolated from sliding contact with the moving cam abutment through its engagement with portions of the provided rocker element thereby avoiding frictional wear of the tubes over the life of the valve.

Accordingly, a primary object of the present invention is to provide a reliably efficient working pinch valve operable over the life of the appliance, e.g., steam iron, in which the valve is installed.

More specifically, it is an object of the present invention to provide an improved pinch valve wherein flexible tubes are isolated from sliding contact with a moving shut off controller to avoid frictional wear of the tubes and thus do not require periodic tube replacing maintenance.

Another object of the present invention is to provide a pinch valve that is simple in construction, economical to manufacture and easily assembled.

Other objects, features and advantages of the invention will become more apparent from the following description, including appended claims and accompanying drawing.

DESCRIPTION OF THE DRAWING

FIG. 1 is a perspective view showing a pinch valve according to the invention embodied in a steam iron.

FIG. 2 is a perspective view of the pinch valve removed from the steam iron.

FIG. 3 is an elevational view, in section along line 3—3 of FIG. 2, showing a first selectable tube-pinching position of the present pinch valve.

FIG. 4 is a sectioned elevational view, similar to FIG. 3, showing a second selectable tube-pinching position of the present pinch valve.

FIG. 5 is a perspective view showing a rocker element fabricated according to the invention removed from the pinch valve.

FIG. 6 is a cross-sectional view taken along line 6—6 of FIG. 5 showing the profile of the rocker element.

DESCRIPTION OF THE PREFERRED EMBODIMENT

Referring to FIG. 1, there is shown a pinch valve 10 built in accordance with the teachings of the present disclosure embodied for use in conjunction with controlling flow of water in a steam iron 12. Tubes 14 and 16 extend from the valve 10 in the direction of arrow 18 for operative coupling with a reservoir 20 for receiving water contained therein. Tube 14 leaves valve 10 and is operatively connected with a water spray nozzle 22 mounted on the steam iron 12. The other tube 16 leaves valve 10 and extends in the direction of arrow 24 for operative connection with a heatable base plate 26 for steam release through steam ports (not shown) on the bottom of base plate 26. Generally stated, pinch valve 10 is used in steam iron 12 to selectably control flow of water pumped, by a suitable pumping device (not shown), from reservoir 20 towards valve 10, and depending on the selected condition of valve 10, water is allowed to pass through one of the tubes 14, 16 either towards nozzle 22 or base plate 26.

With reference to FIG. 2, the pinch valve 10 comprises a body member 28 formed by a base portion 30 supporting parallel upstanding front and rear walls 32 and 34, respectively. The walls 32, 34 are spaced apart defining a recess 36 extending into the base portion 30 terminating in a curved compression surface 38. A selector lever 40 is pivotally supported on a pivot pin 44 extending through each wall 32, 34 of body member 28. An elongated finger-engageable knob 42 forms a portion of the selector lever 40 for manually pivoting lever 40. The width of selector lever 40 is slightly less than the gap formed by recess 36 between wall 32, 34 to permit free pivotal movement of the lever 40 within recess 36. A pair of parallel extending openings or channels 46, 48 extend through the base portion 30 for receiving tubes 14 and 16, respectively.

As best illustrated in sectional FIGS. 3 and 4, the channels 46, 48 are located such that their lower perimeter 50, 52 is tangently aligned with the curved compression surface 38 for support thereon of the tubes 14, 16. Material used to fabricate tubes 14, 16 can be any suitably resilient flexible kind capable of being repeatedly deformed, and self restoring, e.g., a form of rubber. The selector lever 40 is symmetrical in shape about a vertical axis extending centrally through the knob 42 and pivot 44. Stop projections 54 and 56 are located on the selector lever slightly below and on each side of pivot 44 integrally connected by horizontal wall 58. A cam abutment 60 integrally extends downwardly from wall 58 towards compression surface 38. A camming surface 62 of cam abutment 60 comprises a smooth lower curved surface 64 connected with angular side surfaces 66, 68 by rounded corners 70, 72 that function as first and second working cam lobes, as will be discussed.

A V-shaped rocker element 74 defined by arms 76, 78 angularly extending upwardly from a rounded midsection base 80. The rocker 74 freely sits within recess 36 having arms 76, 78 supported on tubes 14 and 16, respectively, with midsection base 80 resting intermediate the parallel tubes 14, 16. A flat top surface 82 of arm 76 is engageable by camming surface 62 causing a lower longitudinally extending edge 84 of arm 76 to operatively bear upon tube 14. In a similar fashion, a flat top surface 86 of arm 78 is engageable by camming surface 62 causing a lower longitudinally extending edge 88 of arm 78 to operatively bear upon tube 16. Each arm 76, 78 is dimensioned uniformly from base 80 along their lengths between top surfaces 82, 86, and bottom edges 84, 88 for effectively applying pressure upon their engaged tubes 14, 16 in correspondingly discrete amounts depending on the condition of selector lever 40.

The selector lever 40 is pivotable between a first position of FIG. 3 and a second position of FIG. 4. In FIG. 3, the lower cam surface 64 of cam abutment 60 is an arc formed by a radius 90 extending from pivot 44. Compression surface 38 is an arc constructed by radius 92, also extending from pivot 44. The radius 92 constructing compression surface 38 is greater in length than radius 90 of cam surface 64. The difference in length between the radii 90 and 92 is slightly less than the thickness of one arm 76, 78 of rocker 74 plus the collapsed double-wall thickness of one completely compressed tube 14, 16. In this regard, when selector lever 40 is in the first position (FIG. 3), the first cam lobe 70 forcibly presses upon top surface 86 of arm 78 causing lower edge 88 to collapse tube 16 on compression surface 38. In the first position, arm 78 of rocker 74 extends substantially parallel to the curvature of compression surface 38. Thus, the tube 16 is forcibly pinched to completely collapse the tube 16 for preventing passage of fluid therethrough. The other arm 76 of rocker 74 is tipped upwardly in the first position of FIG. 3, limited by the abutting relationship between a flat surface 94 on arm 76 in contact with stop projection 54. Accordingly, tube 14 is allowed to substantially open thereby permitting flow of fluid through the open tube 14. As can be seen in FIG. 3, the tipped arm 76 remains engaged with tube 14. By virtue of the inherent resiliency of material selected for fabricating tubes 14, 16, tube 14 continually applies an upwardly biasing force on the arm 76 to urge and to stabilize rocker 74 in the first position. Additionally, lobe 70 is in contact with top surface 86 at a location along arm 78 such that upward resilient forces applied by collapsed tube 16, in resisting being pinched, work to cam the selector lever 40 and hold it in the selected first position.

In the second selected position of FIG. 4, arm 76 of rocker 74 is orientated to extend substantially parallel to the curvature of compression surface 38. Tube 14 is now forcibly pinched in a completely collapsed position to prevent passage of fluid therethrough. The arm 78 is tipped upwardly to a position limited by a flat surface 96 on arm 78 in contact with stop projection 56. Tube 16 is substantially allowed to open thereby permitting flow of fluid through the open tube 16. In the position of FIG. 4, the tipped arm 78 remains engaged with tube 16 by virtue of the inherent resiliency of tube 16 applying a biasing force on the arm 78 to urge and to stabilize rocker 74 in the second position. Cam lobe 72 is in contact with top surface 82 at a location along arm 76 such that resilient forces applied by collapsed tube 14 onto arm 76, in resisting being pinched, work to cam the selector lever 40 and hold it in the selected second position.

FIG. 5 clearly shows the construction shape of rocker element 74. Ends 98 and 100 of arms 76, 78 are T-shaped having a cross-bar portion 102, 104. When rocker 74 is assembled within recess 36, T-shaped ends 98, 100 are located just beyond walls 32, 34 with the cross-bar portion 102, 104 extending beyond the space gap of recess 36. In this manner, the rocker element 74 is longitudinally confined within recess 36. Subsequent rocking motion tending to dislodge rocker 74 from recess 36 is effectively overcome by T-shaped ends 98, 100.

FIG. 6 shows a cross-section profile of arm 78 of rocker 74. As can be seen the profile is substantially a wedge-shape defined by top surface 86 joined with longitudinal edge 88 by angular extending sides 106 and 108. The other arm 76 is identically wedge-shaped in profile. The reason for constructing a wedge-shape profile for arms 76, 78 is to avoid stretching of the tubes 14, 16 during valve 10 operations wherein arms 76 and 78 repeatably open and pinch tubes 14 and 16.

FIGS. 3 and 4 demonstrate the collapsed and open position for each tube 14, 16. As previously mentioned, FIG. 3 shows tube 16 in the completely collapsed position for preventing flow of fluid therethrough while tube 14 is substantially open for permitting flow of fluid. In adjusting valve 10 from the position of FIG. 3 to the selected position of FIG. 4, the selector lever 40 is pivoted in a counterclockwise direction. Initial pivotal movement of selector lever 40 causes the cam lobe 70 and lower cam surface 64 to engagingly slide along top surface 86 of the rocker arm 78. As the selector lever 40 is pivoted towards its vertical or upright position, cam lobe 70 leaves top surface 86 to slidingly engage with top surface 82 of rocker arm 76. Meanwhile, cam lobe 72 slidingly engages top surface 86 and moves towards midsection base 80 of the rocker 74. The sliding movement of lobe 70 along top surface 82 causes the rocker 74 to rock in a clockwise direction about midsection base 80 thereby increasingly compressing tube 14. As the rocker 74 shifts positions, the sliding movement of cam lobe 70 on top surface 82 is resisted by resiliency forces from tube 14 applied on edge 84 of arm 76. Once selector lever 40 attains an upright position, the forces from tube 14 resisting movement of lever 40 are substantially overcome. Further movement of selector lever 40 beyond its upright position results in a snap-like action of rocker 74. The snap action provides a breakaway feedback felt through the selector lever 40. The tube 14 is quickly collapsed due in part by the upward forces from tube 16 applied on edge 88 of arm 78. During snap action, the cam lobe 72 quickly slides off top surface 86 to slidingly engage with top surface 82 for forcibly camming arm 72 downward to completely collapse tube 14. Counterclockwise pivotal motion of selector lever 40 is halted upon abutting contact of stop project 56 with flat surface 96 of rocker 74, as shown in FIG. 4. In the selected position of FIG. 4, the cam lobe 72 is located above collapsed tube 14 along top surface 82 of arm 76 a sufficient extent whereby the combined forces from tubes 14 and 16 coact on rocker 74 for holding selector lever 40 stationary.

The purpose of the above-mentioned snap action occurring during making the valve 10 adjustment is to rapidly change the condition of the tubes 14 and 16 to avoid delay in supplying and blocking flow of fluids toward the desired outlets. In addition, the breakaway or tactile like feedback sensed by the operator through the selector lever 40, provides the operator with an awareness signal that the valve 10 is properly located in the selected position.

To return the valve 10 from the position of FIG. 4 to the position of FIG. 3, a reverse sequence of similar events occurs. The selector lever 40 is pivoted clockwise from the position of FIG. 4. The cam lobe 72 and lower cam surface 64 engagingly slide along top surface 82 of rocker arm 76. As the selector lever 40 approaches its upright position, cam lobe 72 leaves top surface 82 to slidingly engage with top surface 86 of arm 78. As the cam lobe 72 slides along top surface 86 toward T-shaped end 100, the other cam lobe 70 slidingly engages top surface 82 moving toward midsection base 80 causing rocker 74 to rock in a counterclockwise direction substantially about midsection base 80. As this sliding action occurs, tube 16 applies a resiliency force onto edge 88 of arm 78 to resist compression of the tube 16 and, once the selector lever 40 moves beyond its upright position, the upward forces from tube 16 are overcome to quickly and completely collapse tube 16. The cam lobe 70 quickly slides from top surface 82 of arm 76 onto top surface 86 of arm 78, to rock the rocker 74 into the position of FIG. 3 blocking flow of fluid through tube 16 while permitting flow of fluid through tube 14. The movement sensed by the operator in adjusting valve 10 from the position of FIG. 4 to the position of FIG. 3 is also in a snap-like action felt through selector lever 40. As shown in FIG. 3, clockwise pivotal motion of the selector lever 40 is limited by stop projection 54 contacting flat surface 94 of rocker end 98 thereby halting motion of the selector lever 40.

Accordingly, the present pinch valve 10 comprises few parts, namely, selector lever 40, pivot pin 44, rocker element 74 and tubes 14, 16 which are all easily assembled on body member 28. Advantageously, selector lever 40 and rocker element 74 are made from a suitable plastic material having a suitably low coefficient of friction ratio therebetween to enable easy relative sliding movement with little or no concern for maintenance lubrication. The simple plastic construction also contributes essentially to economical fabrication of these parts.

While the foregoing description has disclosed the pinch valve 10 assembled for use in conjunction with directing the flow of water within a steam iron 12, it will be clear to those skilled in the art that valve 10 can be equally embodied in other devices where separation of fluid flow is required. Also, valve 10 can be used to control the flow of a gaseous substance. The important aspect of the present invention resides in applicant providing rocker element 74 to isolate tubes 14, 16 from frictional wear contact with slidably moving members, such as cam abutment 60. In this manner, valve 10 and particularly tubes 14, 16 are relatively maintenance free avoiding replacement due to wear over extended periods of time. Additionally, the exact shape of rocker 74 is not critical and other tube insulating configurations operatively contained in a body member and offering a snap-like action would be equally applicable. Furthermore, rocker 74 is disclosed as operable in conjunction with a pair of tubes 14, 16. However, rocker element 74 may be used as an insulator for a single tube or valves having three or more tubes. Other modifications of this nature will be evident to those skilled in the art and these too are intended to fall within the scope of the invention. The presently disclosed embodiments are therefore to be considered in all respects as illustrative and not restrictive, the scope of the invention being defined by the appended claims rather than by the foregoing description, and all changes which come within the meaning and range of equivalency of the claims are therefore intended to be embraced therein.

What is claimed is:

1. A pinch valve assembly for selectably controlling fluid flow through one of two resiliently deformable tubes, the pinch valve including a body member having a first wall joined in spaced relation to a second wall by a singular compression surface to define a recess in the body member, the compression surface supporting both of the tubes, and a selector lever mounted on the body member for movement between two selectable positions, the improved pinch valve comprising:
   a unitary abutment integrally formed from the selector lever extending within the recess towards the compression surface; and
   a rocker supported on the tubes and located within the recess intermediate the compression surface and said abutment, said rocker operable in a first position for pinching one tube against the compression surface thereby blocking fluid flow therethrough while permitting fluid flow through the other tube when the selector lever is in one of the selectable positions and operable in a second position for pinching said other tube against the compression surface thereby blocking fluid flow through said one tube when the selector lever is in the other selectable position, said rocker is slidably engaged by said abutment for movement of said rocker between said first and second operable positions for isolating the tubes from sliding contact with said abutment thereby preventing frictional wear of the tubes.

2. A pinch valve assembly according to claim 1 wherein said rocker includes:
   a first arm having a first flat top surface slidably engageable by said abutment, said first arm operable for collapsing said one tube through said abutment engaging said first flat top surface thereby blocking fluid flow therethrough when said rocker is in said first position and for allowing said one tube to open from said collapsed position through said abutment being removed from engagement with said first flat top surface thereby permitting fluid flow through said one tube when said rocker is in said second position; and
   a second arm having a second flat top surface slidably engageably by said abutment, said second arm operable for collapsing said other tube through said abutment engaging said second flat top surface thereby blocking fluid flow therethrough when said rocker is in said second position and for allowing said other tube to open from said collapsed position through said abutment being removed from engagement with said second flat top surface thereby permitting fluid flow through said other tube when said rocker is in said first position.

3. A pinch valve assembly according to claim 2 wherein said abutment includes:
   a camming surface engageably cooperable with said first and second arms for selectively locating said rocker in said first and second positions to open and close a selected one of the tubes for discretely allowing fluid flow therethrough; and
   a lobe on said camming surface for engaging said first arm for pinching said one tube against the compression surface while said second arm being free from engagement with said camming surface for allowing said other tube to open when said rocker is in said first position.

4. A pinch valve assembly according to claim 3 wherein said first and second arms form a V-shaped rocker, said lobe operable for sliding movement from said first arm onto said second arm for engageably rocking said V-shaped rocker from said first position towards said second position, said one tube biasing said first arm towards said second position and the combination of said rocking movement of said V-shaped rocker by said lobe and the biasing effect on said first arm by said one tube providing a snapping action to the selector lever in response to selector movement between the two selectable positions.

5. A pinch valve assembly according to claim 3 wherein said camming surface further includes:
   a second lobe for engaging said second arm for pinching said other tube against the compression surface while said first arm being free from engagement with said camming surface for allowing said one tube to open when said rocker is in said second position.

6. A pinch valve assembly according to claim 5 wherein said first and second arms form a V-shaped rocker, said second lobe operable for sliding movement from said second arm onto said first arm for engageably rocking said V-shaped rocker from said second position towards said first position, said other tube biasing said second arm towards said first position and the combination of said rocking movement of said V-shaped rocker by said second lobe and the biasing effect on said second arm by said other tube providing a snapping action to the selector lever in response to selector lever movement between the two selectable positions.

7. A pinch valve assembly according to claim 2 wherein the compression surface is a curved surface extending substantially parallel to said first arm when said first arm is in said first position and said curved surface extending substantially parallel to said second arm when said second arm is in said second position.

8. A pinch valve assembly according to claim 1 wherein the selector lever includes:
   a first stop projection for engaging said rocker to limit movement of the selector lever in one of the two selectable positions.

9. A pinch valve assembly according to claim 8 wherein the selector lever further includes:
   a second stop projection for engaging said rocker to limit movement of the selector lever in the other one of the two selectable positions.

10. A pinch valve assembly according to claim 1 wherein said rocker has a first arm co-operable with one of the tubes, a second arm joined with said first arm and co-operable with the other tube, said first and second arm extending from within the recess to a terminal end thereof located outside the recess and structure means including a T-shaped construction located at said terminal end of each one of said arms for confining said rocker within the recess.

11. A pinch valve assembly according to claim 10 wherein said T-shaped construction includes a cross bar greater in length than the spaced gap of said recess formed between said first and second walls.

* * * * *